s011039013B1

(12) United States Patent
Garrod et al.

(10) Patent No.: US 11,039,013 B1
(45) Date of Patent: Jun. 15, 2021

(54) REAL-TIME CONTACT CENTER SPEECH ANALYTICS, WITH CRITICAL CALL ALERTS, DEPLOYED ACROSS MULTIPLE SECURITY ZONES

(71) Applicants: David Garrod, Pittsburgh, PA (US); Wayne Ramprashad, Pittsburgh, PA (US)

(72) Inventors: David Garrod, Pittsburgh, PA (US); Wayne Ramprashad, Pittsburgh, PA (US)

(73) Assignee: Medallia, Inc., San Francisco, CA (US)

( * ) Notice: Subject to any disclaimer, the term of this patent is extended or adjusted under 35 U.S.C. 154(b) by 0 days.

(21) Appl. No.: 16/845,873

(22) Filed: Apr. 10, 2020

(51) Int. Cl.
| | |
|---|---|
| *H04M 3/00* | (2006.01) |
| *H04M 5/00* | (2006.01) |
| *H04M 3/51* | (2006.01) |
| *G10L 15/26* | (2006.01) |
| *G10L 15/30* | (2013.01) |
| *H04M 3/42* | (2006.01) |
| *G06F 21/62* | (2013.01) |

(52) U.S. Cl.
CPC ...... *H04M 3/5175* (2013.01); *G06F 21/6245* (2013.01); *G10L 15/26* (2013.01); *G10L 15/30* (2013.01); *H04M 3/42221* (2013.01); *H04M 2203/301* (2013.01); *H04M 2203/303* (2013.01); *H04M 2203/558* (2013.01); *H04M 2203/6009* (2013.01)

(58) Field of Classification Search
CPC ..... G06F 21/6245; G10L 15/26; G10L 15/30; H04M 3/5175; H04M 3/42221; H04M 2203/301; H04M 2203/303; H04M 2203/558; H04M 2203/6009

USPC ...... 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1

See application file for complete search history.

(56) References Cited

U.S. PATENT DOCUMENTS

| | | | | |
|---|---|---|---|---|
| 6,678,360 | B1 * | 1/2004 | Katz ................... | G07C 11/00 379/127.01 |
| 7,023,979 | B1 * | 4/2006 | Wu ..................... | H04M 3/5233 379/265.11 |
| 7,606,714 | B2 * | 10/2009 | Williams ............. | G10L 13/027 704/275 |
| 8,798,242 | B1 * | 8/2014 | Sankaranarayanan .. | H04M 3/51 379/88.22 |
| 8,812,319 | B2 * | 8/2014 | Skerpac ............... | G10L 17/24 704/246 |
| 9,876,909 | B1 * | 1/2018 | Klein .................. | H04L 12/1827 |
| 2005/0105712 | A1 * | 5/2005 | Williams ............. | H04M 3/5166 379/265.02 |
| 2005/0254632 | A1 * | 11/2005 | Pasquale ............. | H04M 3/523 379/88.04 |
| 2006/0233326 | A1 * | 10/2006 | Erhart ................ | H04M 3/5166 379/88.16 |

(Continued)

*Primary Examiner* — Khai N. Nguyen
(74) *Attorney, Agent, or Firm* — David Garrod, Esq.

(57) ABSTRACT

The invention relates to systems/methods that enable real-time monitoring/processing of contact center communications to provide timely, actionable analytic insights and real-time critical call alerts, while simultaneously providing best-in-class protection of sensitive customer information.

20 Claims, 12 Drawing Sheets

(56) References Cited

U.S. PATENT DOCUMENTS

| | | | |
|---|---|---|---|
| 2008/0301021 A1* | 12/2008 | Kwong Hin Sang | G06Q 20/02 705/35 |
| 2008/0309491 A1* | 12/2008 | Gillard | G08B 25/009 340/572.1 |
| 2011/0211679 A1* | 9/2011 | Mezhibovsky | H04M 3/42382 379/88.18 |
| 2013/0132091 A1* | 5/2013 | Skerpac | G06F 21/32 704/273 |
| 2014/0162598 A1* | 6/2014 | Villa-Real | G06Q 20/363 455/411 |
| 2016/0012465 A1* | 1/2016 | Sharp | G06Q 20/386 705/14.17 |
| 2018/0007205 A1* | 1/2018 | Klein | H04L 67/42 |
| 2020/0058295 A1* | 2/2020 | Debnath | G10L 15/08 |

* cited by examiner

FIG. 3 (process view of FIG. 1 embodiment)

FIG. 4 (process view of FIG. 2 embodiment)

☐ Personal Names / Numbers

☐ include gender

☐ domestic / foreign / unknown

☐ Ages

☐ by decades (20-29, 30-39, 40-49, etc.)

☐ child / young adult / middle age / elder

☐ Locations

☐ by state

☐ by city / metro

☐ by zip code

- ☐ Organizations / Entities
  - ☐ government / for-profit / non-profit
  - ☐ line of business (healthcare, retail, etc.)
- ☐ Health Conditions / Procedures / Treatments
  - ☐ medical / dental / psychiatric
  - ☐ cardio-vascular / infection / ortho / etc.
  - ☐ anxiety / depression / addiction / etc.

FIG. 8b

REAL-TIME CONTACT CENTER SPEECH ANALYTICS, WITH CRITICAL CALL ALERTS, DEPLOYED ACROSS MULTIPLE SECURITY ZONES

FIELD OF THE INVENTION

This invention relates generally to the fields of audio/speech data processing, particularly audio/speech analytics based on speech-to-text ("STT") conversion, and more particularly systems/methods to provide such audio/speech analytics, along with critical call alerts, in real time. Furthermore, the invention relates to improved processes/systems for managing, redacting/tokenizing, storing, and selectively distributing Personally Identifiable Information ("PII"), Nonpublic Personal Information ("NPI"), Personal Health Information ("PHI"), Sensitive Personal Information ("SPI"), Personal Credit Information ("PC"), and the like (collectively referred to hereafter as "sensitive information") in connection with such audio/speech analytics processes and deployments.

BACKGROUND OF THE INVENTION

The modern contact center operates in a fast-paced and ever-changing environment. Indeed, there is often no "center" at all, but rather a distributed network of telephony equipment that services a widely distributed network of agents, some of whom may work in remote sites (e.g., at home) and some whom may work from various countries around the globe. A business process outsourcing ("BPO") industry provides flexibility to expand and contract an enterprise's virtual contact center as business needs require. Such services are available from The Results Company, InContact, FiveNine, and many others.

This distributed "virtual" contact center infrastructure affords many advantages to an enterprise, such as the ability to scale for seasonal demand or to meet emergency needs (such as the current Covid-19 crisis) and the ability to provide off-hours service using agents from different geographic time zones. However, using outsourced agents who may have little experience with the enterprise also presents a significant risk to the quality of customer service that such agents provide. Thus, timely monitoring and reporting of customer-agent interactions is more important than ever. Preferably, such monitoring should include both analytics (to gauge overall customer sentiment, agent performance and to spot trends) and critical call spotting (to avoid customer churn, for example). Furthermore, for optimal results, such monitoring should be available in real time or near real time.

While real-time monitoring of a distributed contact center provides many advantages, it also presents challenges because of the myriad of contractual and legal restrictions on the storage, use, processing and/or dissemination of sensitive information. Accordingly, there is a presently existing need for improved systems/processes for providing real-time contact center monitoring, alerting and analytics, while ensuring appropriate treatment of sensitive customer information. Embodiments of the present invention are intended to address such need.

SUMMARY OF THE INVENTION

In light of the above, a principle object of the present invention relates to systems/methods that enable real-time monitoring/processing of contact center communications to provide timely, actionable analytic insights and real-time critical call alerts, while simultaneously providing best-in-class protection of sensitive customer information.

Accordingly, generally speaking, and without intending to be limiting, one aspect of the invention relates to systems/processes for telephonic contact center monitoring in which: (a) at least the following steps are performed within a first (less secure) security zone: (i) receiving, in real time, contact center telephony data indicative of multiple agent-caller communications; (ii) separating, in real time, the received telephony data into tagged utterances, each representing a single utterance spoken by either an agent or a caller; and (iii) using a privacy-filtering ASR engine to process each utterance, in real time, into a corresponding sanitized ASR transcription; and (b) at least the following steps are performed within a second (more secure) security zone: (i) receiving, in real time, the tagged utterances; (ii) updating, in real time, a database to include each tagged utterance; and (iii) receiving, in real time, a critical call alert.

In some embodiments, the second (higher) security zone permits access by fewer users than the first security zone. In some embodiments, access to the second (higher) security zone is restricted to individuals who have successfully passed a criminal background check, drug test, and credit check.

In some embodiments, the steps performed within the second (higher) security zone further include: (iv) investigating the critical call alert by retrieving from the database utterance(s) associated with the identified critical call. In some embodiments, the steps performed within the second security zone further include: (v) employing a speech browser to display/play sanitized ASR transcript(s) and corresponding (unsanitized) utterance(s) associated with the identified critical call.

In some embodiments, steps (a)(i)-(iii) are performed (in the lower security zone) without storing any contact center telephony data in non-volatile storage locations. In some embodiments, immediately following transcription of an utterance in step (a)(iii), all contact center telephony data that corresponds to the transcribed utterance is removed/whitewashed from any computer readable storage device(s) in the first security zone.

In some embodiments, the steps performed within the first (lower) security zone further include: (iv) updating, in real time, a database to include the sanitized ASR transcription.

In some embodiments, step (a)(iii) utilizes an ASR engine to transcribe each utterance and a post-ASR redaction engine redact each transcription in accordance with specified redaction criteria. In some embodiments, step (a)(iii) utilizes a privacy-by-design STT engine to transcribe only non-sensitive information in accordance with an associated privacy-by-design language model.

Some embodiments include an initial step of selecting class(es) of sensitive information to tokenize, including one or more of: (1) personal names or identifying numbers; (2) ages; (3) locations; (4) organizations or entities; and/or (5) health conditions, procedures or treatments. Some embodiments further include an initial step of selecting one or more of the selected class(es) (1)-(5) for stratified tokenization.

In some embodiments, the steps performed within the first (lower) security zone further include: (v) providing real time analytics, based on the sanitized ASR transcriptions.

And some embodiments include the step of using a ML/NLP classifier to identify critical calls, in real time, based on the sanitized ASR transcriptions.

Again, generally speaking, and without intending to be limiting, another aspect of the invention relates to systems/ processes for telephonic contact center monitoring in which: (a) at least the following steps are performed within a first (higher) security zone: (i) receiving, in real time, contact center telephony data indicative of multiple agent-caller communications; (ii) separating, in real time, the received telephony data into tagged utterances, each representing a single utterance spoken by either an agent or a caller; (iii) updating, in real time, a database to include each tagged utterance; (iv) using a privacy-filtering ASR engine to process each utterance, in real time, into a corresponding sanitized ASR transcription; and (v) receiving, in real time, a critical call alert; and (b) at least the following step(s) are performed within a second (lower) security zone: (i) updating, in real time, a database to include each sanitized ASR transcription.

In some embodiments, the steps performed within the second (lower) security zone further include: (ii) providing real time analytics, based on the sanitized ASR transcriptions.

In some embodiments, step (a)(iv) utilizes an ASR engine to transcribe each utterance and a post-ASR redaction engine redact each transcription in accordance with specified redaction criteria. In some embodiments, step (a)(iv) utilizes a privacy-by-design STT engine to transcribe only non-sensitive information in accordance with an associated privacy-by-design language model.

Some embodiments include an initial step of selecting class(es) of sensitive information to tokenize, which may include one or more of: (1) personal names or identifying numbers; (2) ages; (3) locations; (4) organizations or entities; and (5) health conditions, procedures or treatments. In some embodiments, such initial step may further include selecting one or more of the selected class(es) for stratified tokenization.

Still further aspects of the invention relate to computer executable instructions, embodied in non-transitory media, for implementing parts or all of the systems and processes described herein.

BRIEF DESCRIPTION OF THE FIGURES

Aspects, features, and advantages of the present invention, and its exemplary embodiments, can be further appreciated with reference to the accompanying set of figures, in which:

FIGS. 8a-b show exemplary screen(s) suitable for selection of sensitive information classes to tokenize, and selection of stratification options within the selected classes, for use in connection with certain embodiments of the present invention;

DESCRIPTION OF PREFERRED EMBODIMENT(S)

Figure 1:
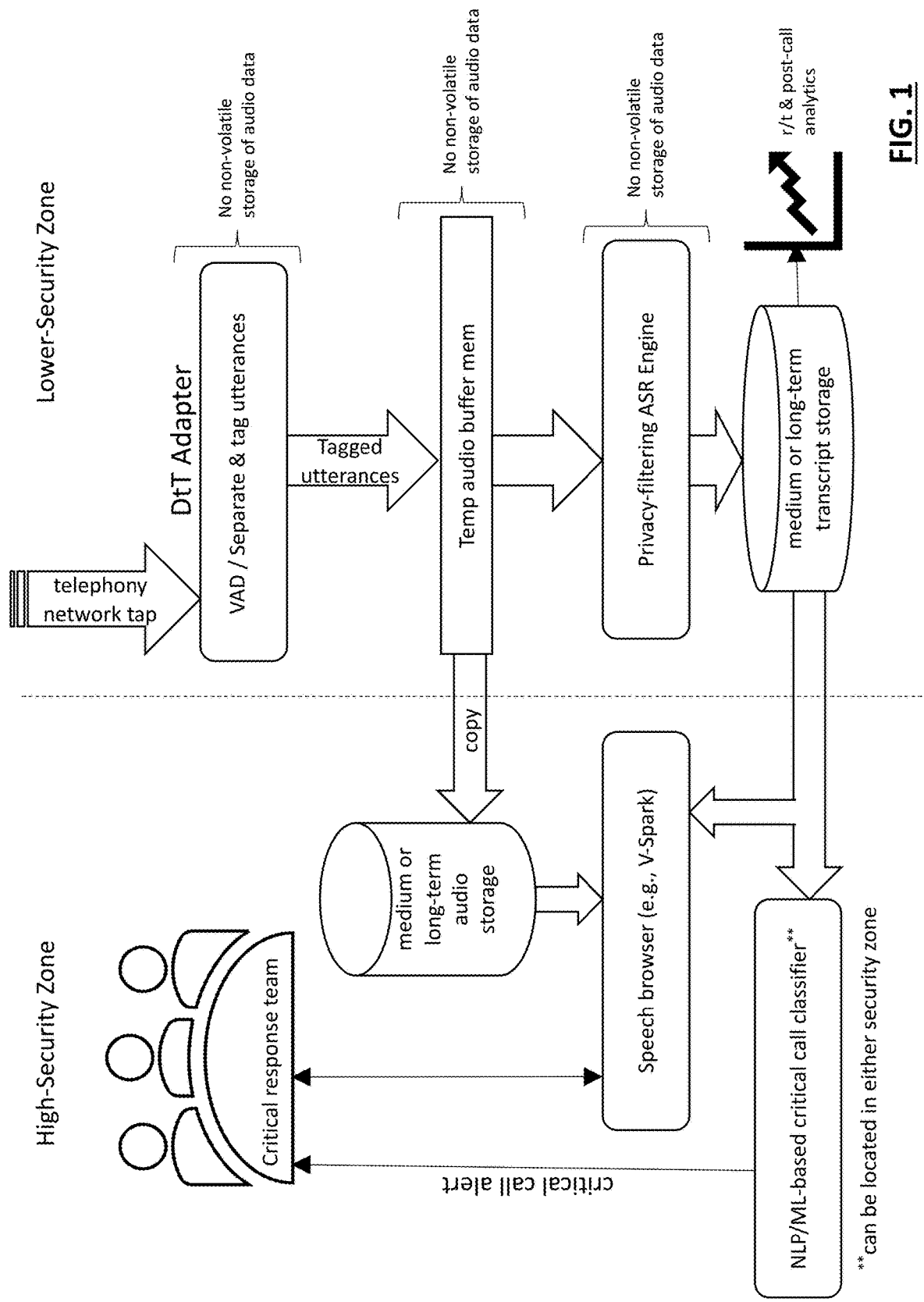
FIG. 1 depicts an exemplary deployment of real-time contact center speech analytics, with critical call alerts, according to a first embodiment of the invention.

Reference is initially made to FIG. 1, which depicts an exemplary deployment of real-time contact center speech analytics, with critical call alerts, according to a first embodiment of the invention. The diagram shows certain portions operating within a high security zone (left of the dashed line) and other components operating within a lower security zone (right of the dashed line).

In this embodiment, telephony data is captured within (or enters via) the lower security zone. Preferred methods for capturing or receiving real-time contact center telephony data are described in U.S. patent application Ser. No. 16/371,011, entitled "On-The-Fly Transcription/Redaction Of Voice-Over-IP Calls," filed Mar. 31, 2019 by inventors Koledin et al., which application is commonly owned by assignee Voci Technologies, Inc., and is incorporated by reference herein.

A direct-to-transcription ("DtT") adapter preferably performs voice activity detection ("VAD") and, upon detection of an active voice signal, segregates it into sequential utterances, tags each and stores them in a temporary audio buffer, pending ASR processing.

Voice activity detection is an optional step. Its main function is to eliminate dead space, to improve utilization efficiency of more compute-intensive resources, such as the ASR engine, or of storage resources. VAD algorithms are well known in the art. See https://en.wikipedia.org/wiki/Voice_activity_detection (incorporated by reference herein).

Segregation of the speech input into words or utterances (preferred) is performed as an initial step to ASR decoding. Though depicted as a distinct step, it may be performed as part of the VAD or ASR processes.

Because the DtT adapter and temporary audio buffer operate within the lower security zone, it is preferred that both avoid any use of non-volatile storage media. It is also preferred that both perform a whitewash process on any volatile storage locations used to store telephony or audio data once the need to maintain such data ends.

In this first embodiment, privacy-filtering ASR processing is performed within the lower security zone. Hence, such processing should preferably be performed without any use of non-volatile storage media and with audio data whitewash upon completion. The privacy-filtering ASR engine produces sanitized transcriptions that can be used, processed and distributed within the lower security zone. One such use of these transcripts is to provide real-time and/or post-call analytics for unrestricted use and distribution within the enterprise. Because the privacy-filtered (sanitized) transcripts contain no sensitive information, it is acceptable to store them long-term within the lower security zone.

Focusing now on the high security zone, a critical call classifier—utilizing natural language processing ("NLP")/ machine learning ("ML") techniques—is used to identify critical calls (e.g., customers likely to leave, angry customers, agent misbehavior, etc.) immediately upon their transcription. (In fact, such determination need not await complete transcription of the call, but may proceed in real time while the call is still in progress.) Because the critical call classifier makes its determination based upon the sanitized ASR transcripts, it can be alternatively located within the lower security zone.

Once a call is identified as critical, an immediate alert is sent to a critical response team that operates within the high security zone. Using a speech browser (such as assignee Voci's V-Spark product), members of the critical response team can listen to the call's unfiltered (unredacted) audio utterances to verify criticality and plan appropriate corrective action.

Figure 3:
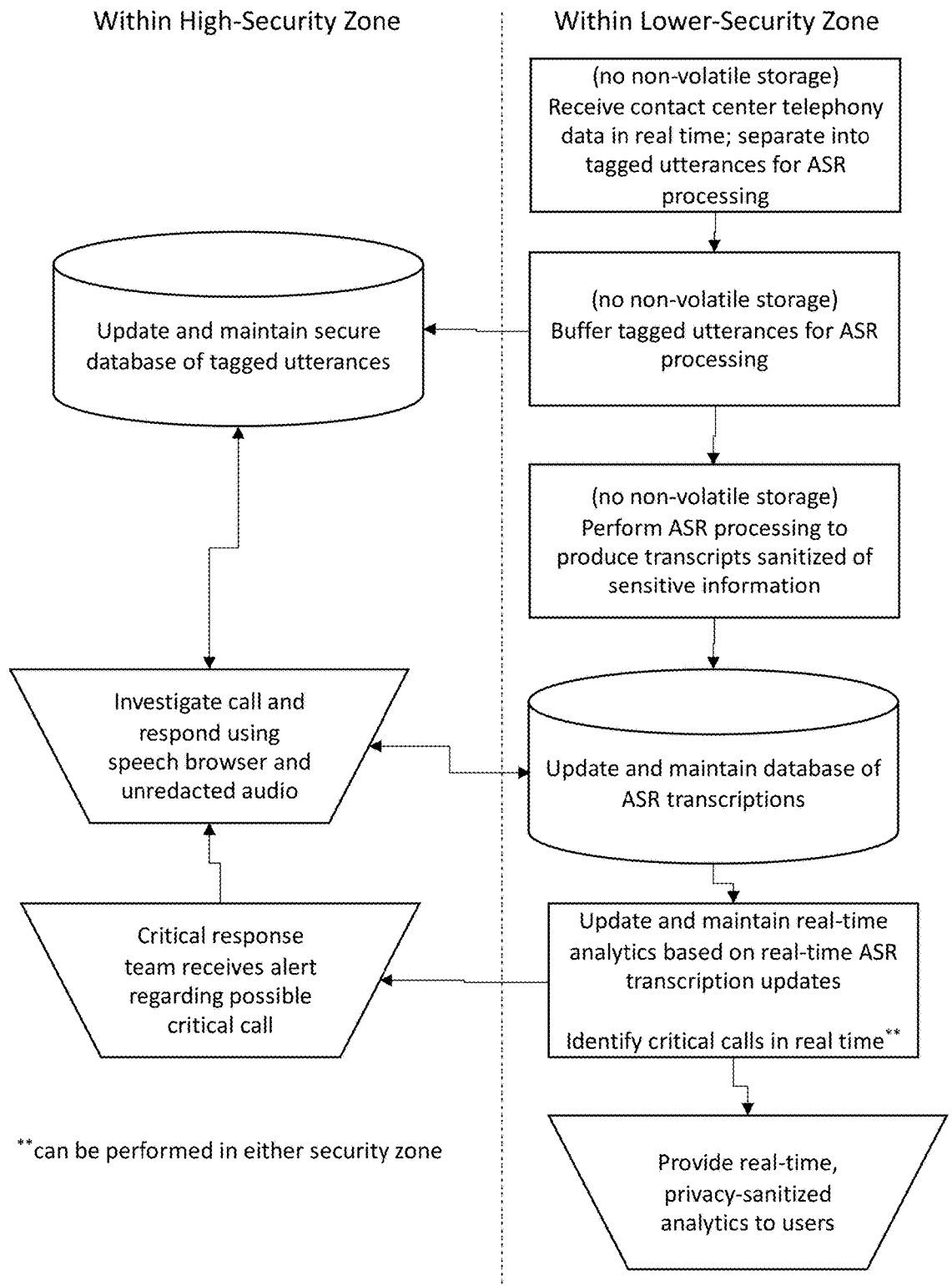
FIG. 3 shows a process view of real-time contact center speech analytics, with critical call alerts, using the FIG. 1 embodiment.

FIG. 3 shows a process view of this first embodiment.

Figure 2:
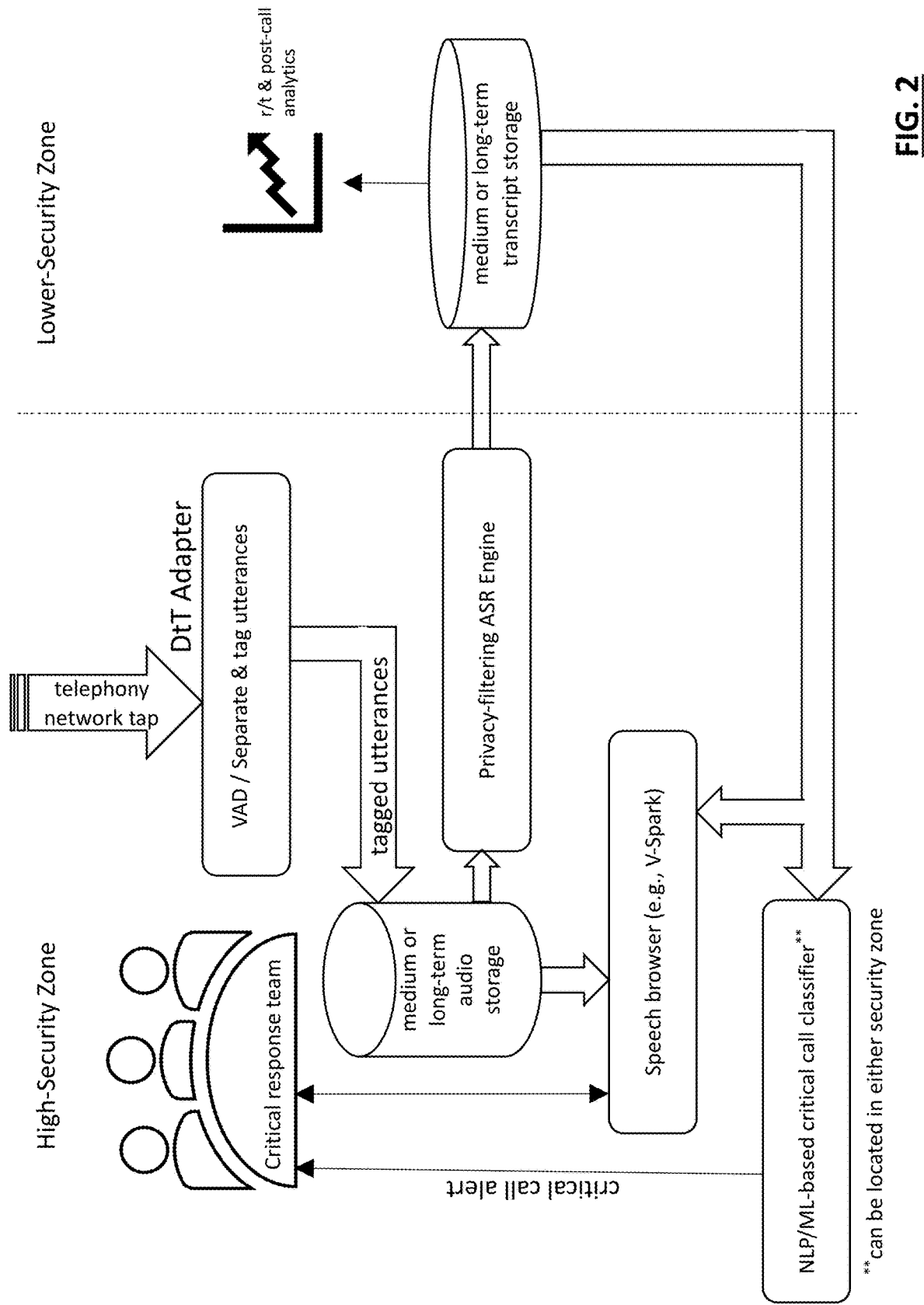
FIG. 2 depicts an exemplary deployment of real-time contact center speech analytics, with critical call alerts, according to a second embodiment of the invention.

Reference is now made to FIG. 2, which depicts an exemplary deployment of real-time contact center speech analytics, with critical call alerts, according to a second embodiment of the invention. This embodiment places more functional units within the high security zone (left of the dashed line) and fewer in the lower security zone (right of the line). Here, because they operate within the high security zone, the DtT adapter (with its VAD and utterance separation/tagging functions), tagged utterance buffer, and privacy-filtering ASR engine need not avoid use of non-volatile storage media or implement post-use whitewashing procedures.

This embodiment shows the critical call classifier located in the high security zone; however, as before, it can alternatively be located in the lower security zone. Other details —critical call response, as well as real-time and post-call analytics—are the same in this embodiment as in the first embodiment.

Figure 4:
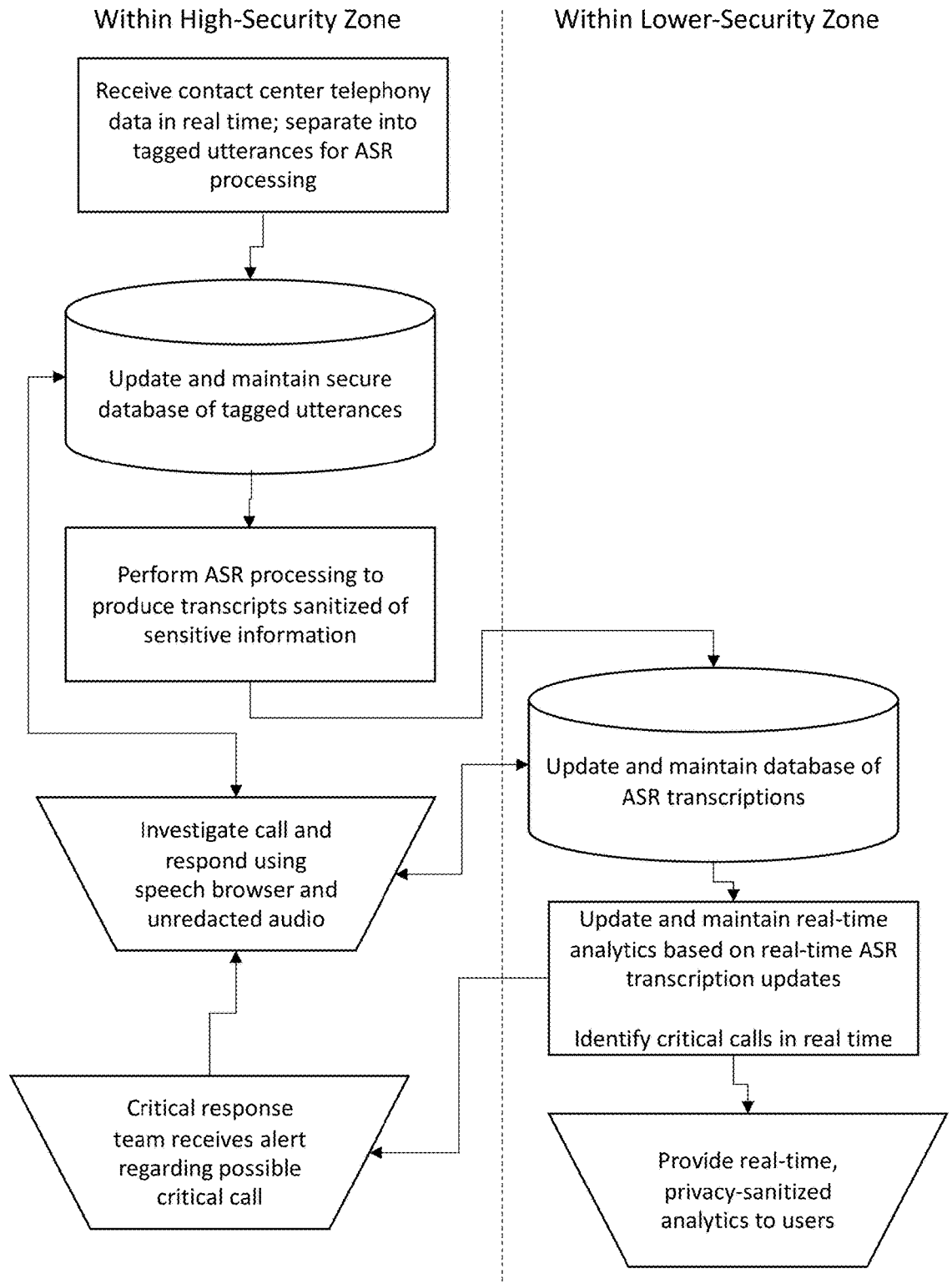
FIG. 4 shows a process view of real-time contact center speech analytics, with critical call alerts, using the FIG. 2 embodiment.

FIG. 4 shows a process view of this second embodiment.

Figure 5:
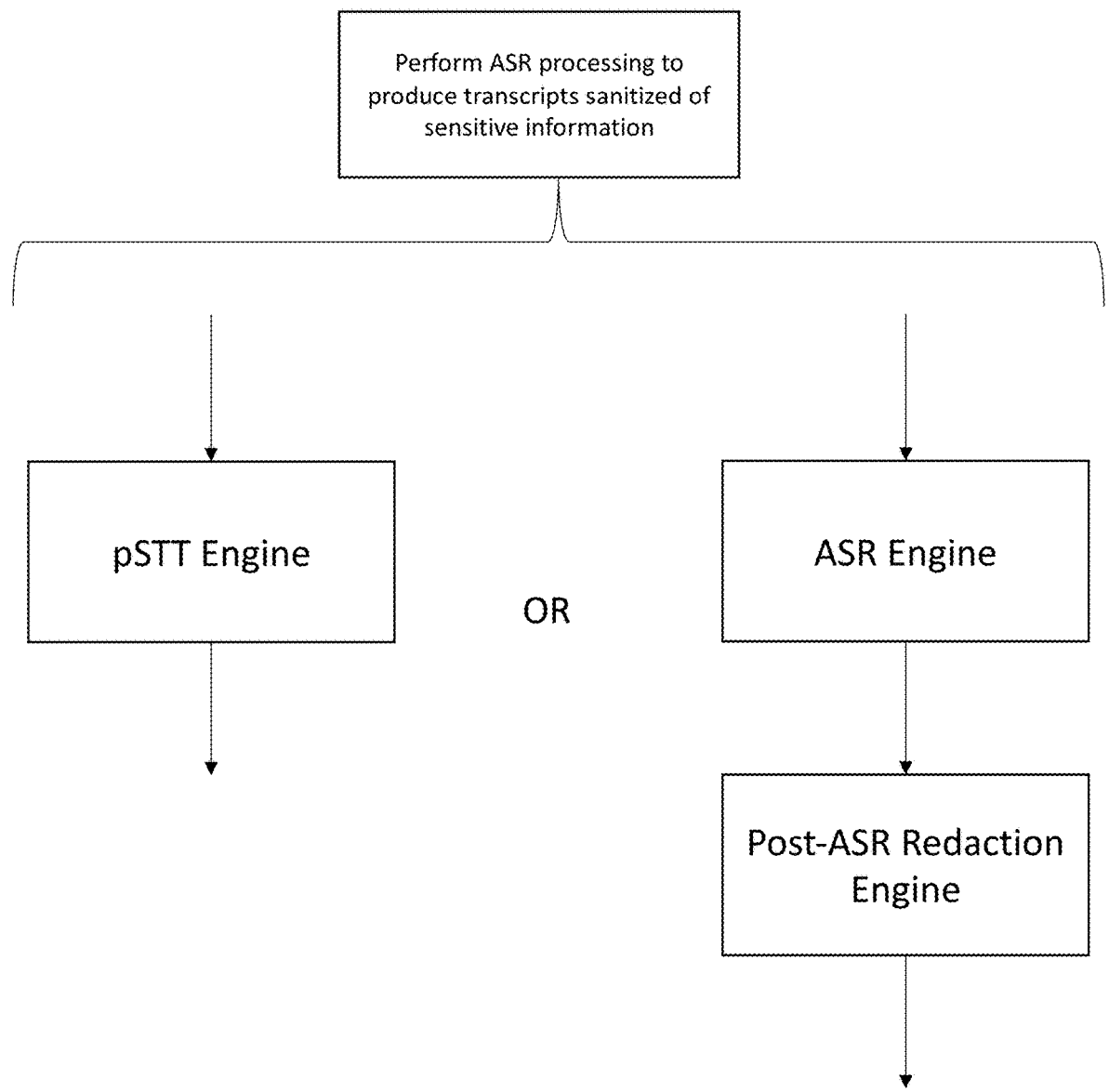
FIG. 5 depicts two alternative approaches to privacy-filtering ASR processing in accordance the present invention.

Reference is now made to FIG. 5, which depicts two alternative approaches to privacy-filtering ASR processing in accordance the present invention. As depicted, privacy-filtering ASR processing may employ either (i) a pSTT engine (the preferred approach) or (ii) an ordinary ASR engine with post-ASR redaction. In both cases, each of the components (pSTT engine, ASR engine, post-ASR redaction engine) may be located on premises, in a cloud, or across a combination of the two (for example, a configuration that uses the cloud only when on-premises capacity is exhausted).

Figure 6:
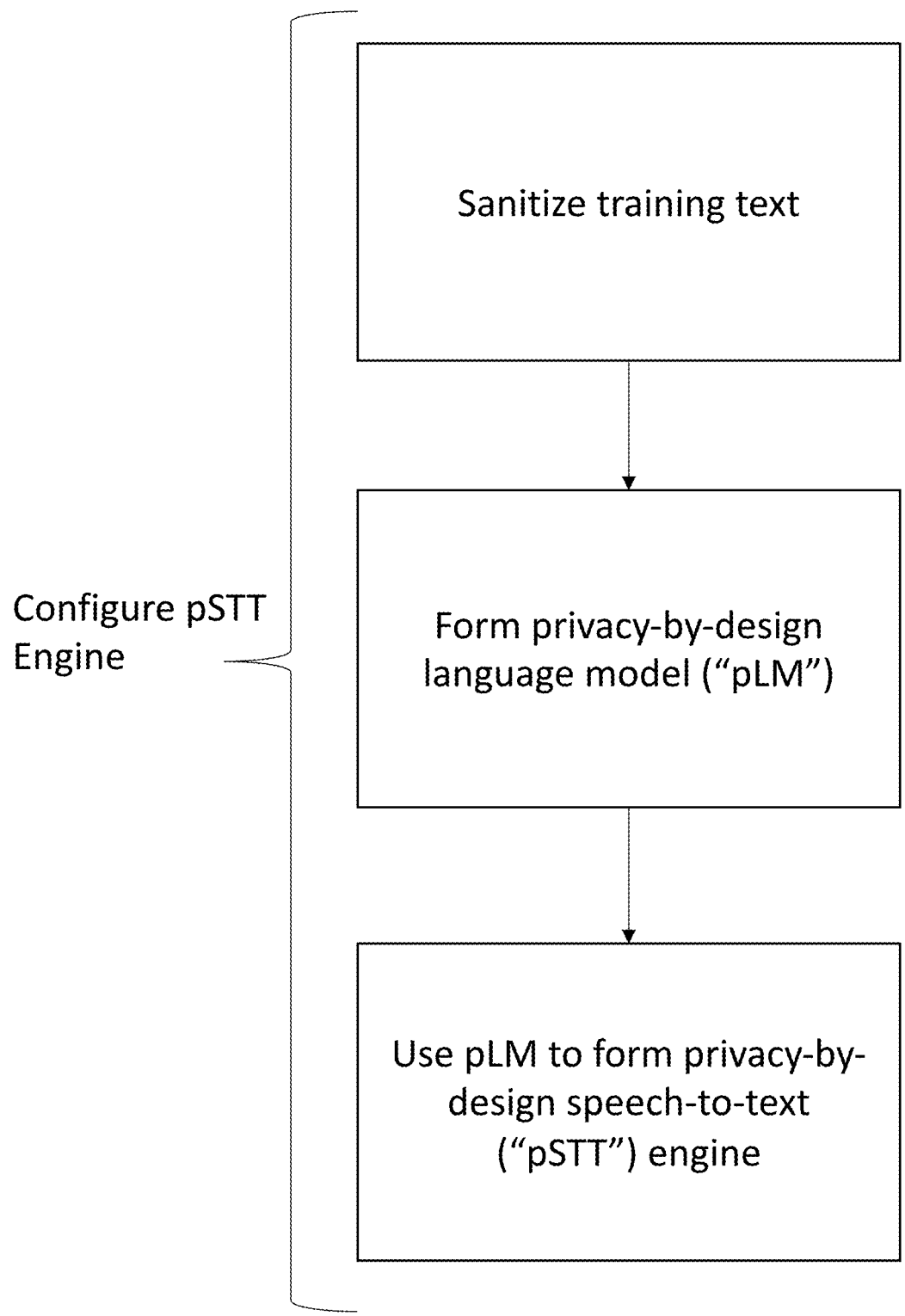
FIG. 6 depicts the basic steps involved in configuring a privacy-by-design speech-to-text ("pSTT") engine suitable for use in connection with the present invention.

Reference is now made to FIG. 6, which depicts the basic steps involved in configuring a pSTT engine for use in connection with the present invention. A pSTT engine is an ASR engine that operates with a privacy-by-design language model ("pLM"). Because the pLM is trained on sanitized (tokenized) text, it automatically tokenizes sensitive information (hence achieving "privacy by design") as part of the recognition process. Details regarding the configuration and use of pSTT engines and pLM's are described in U.S. patent application Ser. No. 16/845,146, entitled "Privacy-by-Design Speech-to-Text Processing and Speech Analytics," filed Apr. 10, 2020 by inventors Garrod and Hines, which application is commonly owned by assignee Voci Technologies, Inc., and is incorporated by reference herein.

Figure 7:
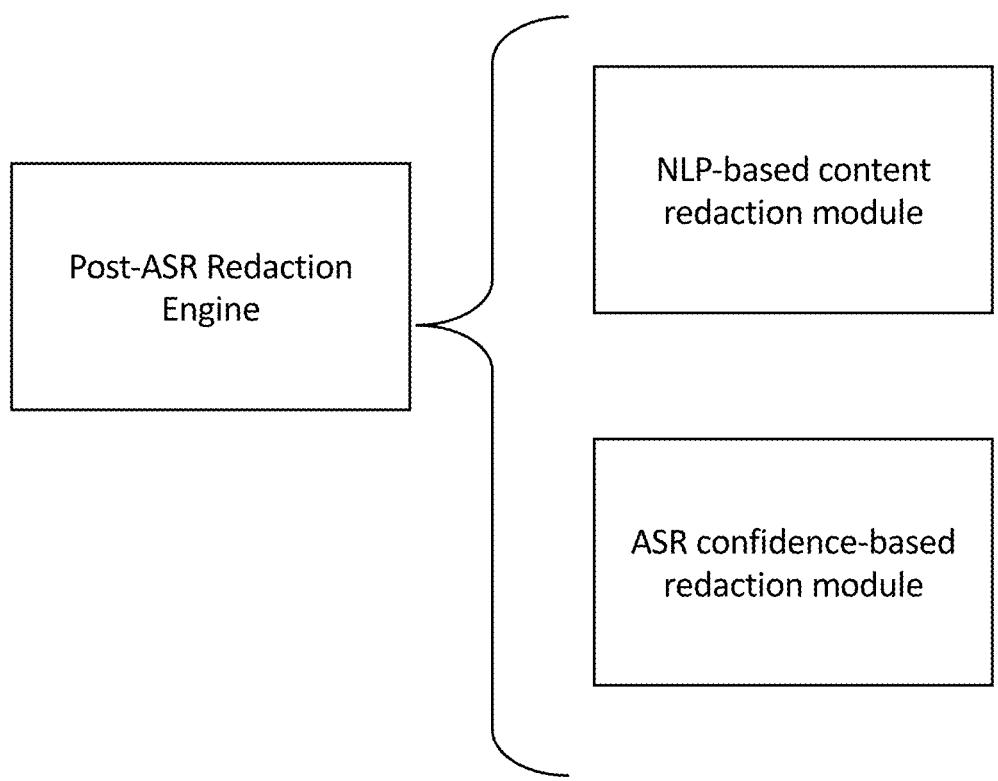
FIG. 7 depicts a preferred form of post-ASR redaction engine suitable for use in connection with the present invention.

Reference is now made to FIG. 7, which depicts a preferred form of post-ASR redaction engine suitable for use in connection with the present invention. Here, the post-ASR redaction engine may involve just a NLP-based content redaction module, or such in combination with a confidence-based redaction module. Both approaches are described in U.S. patent application Ser. No. 16/162,997, entitled "Use of ASR Confidence to Improve Reliability of Automatic Audio Redaction," filed Oct. 17, 2018 by inventors Garrod et al., which application is commonly owned by assignee Voci Technologies, Inc., and is incorporated by reference herein.

Reference is now made to FIGS. 8a-b, which show exemplary screen(s) suitable for selection of sensitive information classes to tokenize, and selection of stratification options within the selected classes, for use in connection with certain embodiments of the present invention. Preferred methods for selection of sensitive information classes to tokenize, stratification within the selected classes, and privacy-preserving analytics based on same are described in U.S. patent application Ser. No. 16/836,315, entitled "Privacy-by-Design Speech-to-Text Processing and Speech Analytics," filed Mar. 31, 2020 by inventor Garrod, which application is commonly owned by assignee Voci Technologies, Inc., and previously incorporated by reference herein.

Figure 9:
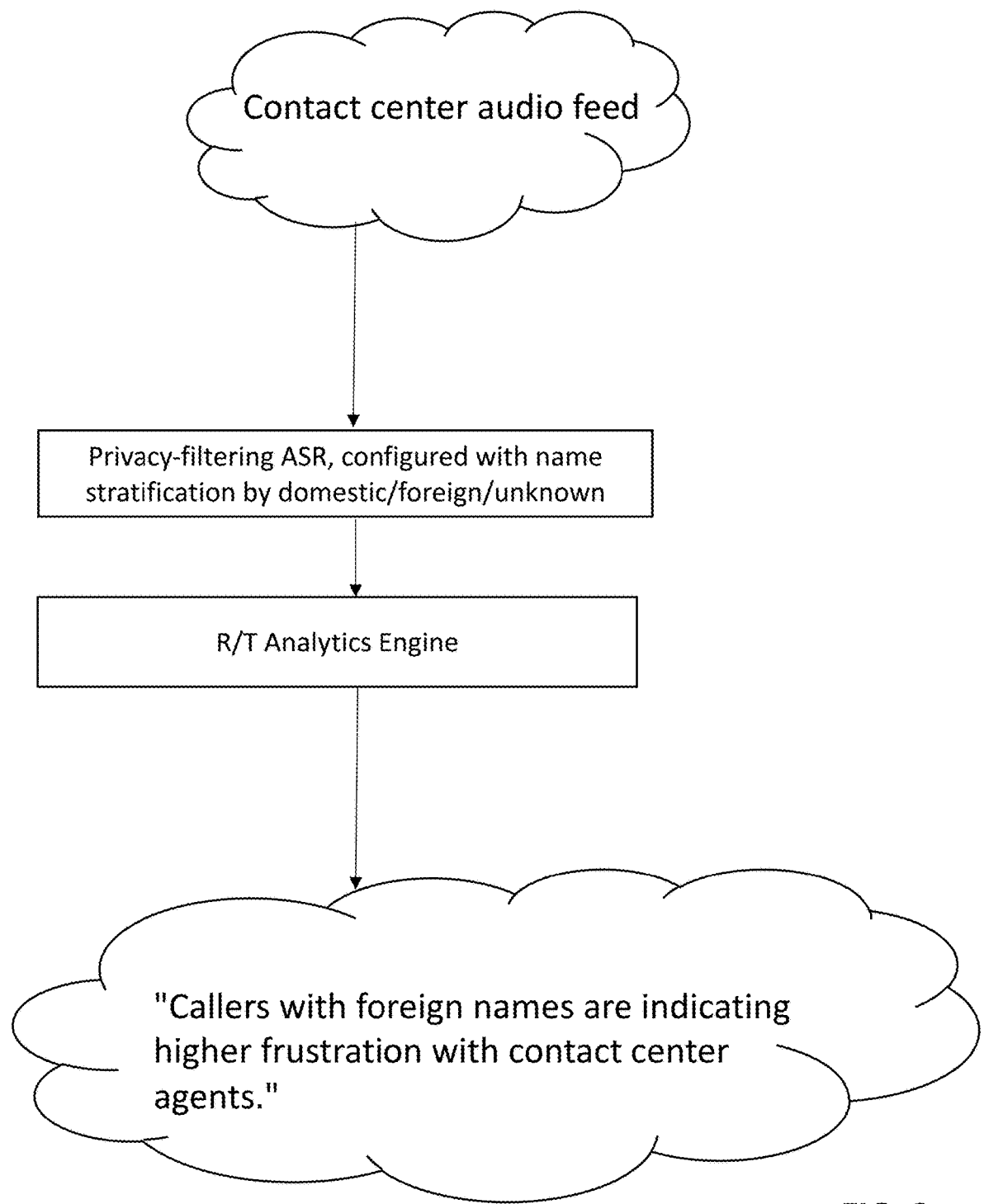
FIG. 9 shows an example of privacy-preserving analytics, based on real-time stratified, tokenized ASR transcriptions, as enabled by the present invention.

Reference is now made to FIG. 9, which shows an example of privacy-preserving analytics, based on real-time stratified, tokenized ASR transcriptions, as enabled by the present invention. Preferred methods for using stratified, tokenized ASR transcripts to produce privacy-preserving analytics are described in U.S. patent application Ser. No. 16/845,146, entitled "Privacy-by-Design Speech-to-Text Processing and Speech Analytics," filed Apr. 10, 2020 by inventors Garrod and Hines, which application is commonly owned by assignee Voci Technologies, Inc., and previously incorporated by reference herein.

Figure 10:
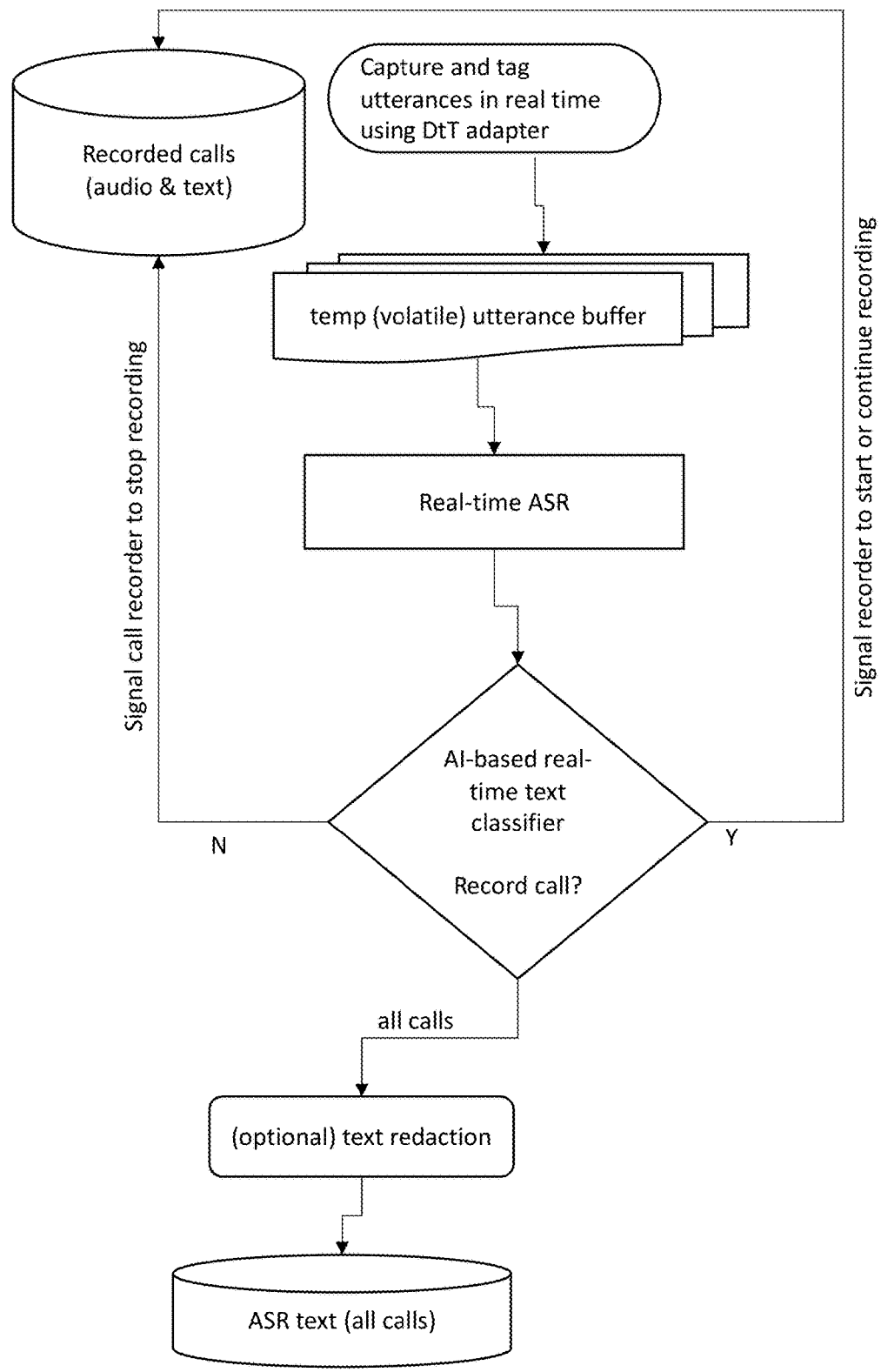
FIG. 10 shows a first (preferred) real-time selective call recording flow for use in connection with certain embodiments of the invention; and, FIG. 11 shows a second (alternative) real-time selective call recording flow for use in connection with certain embodiments of the invention.
Figure 11:
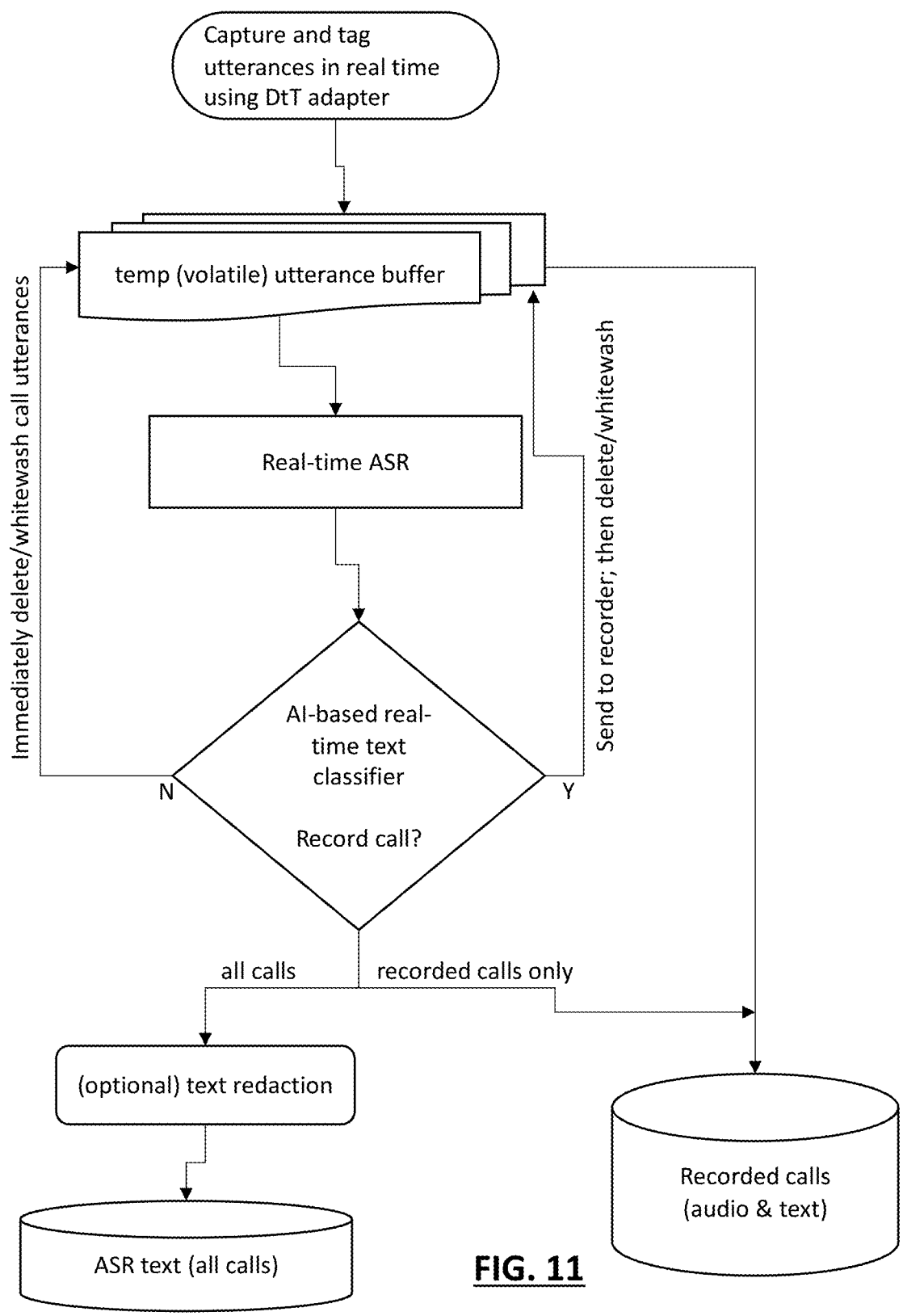

Reference is now made to FIGS. 9 & 10, each of which shows an exemplary real-time selective call recording flow for use in connection with certain embodiments of the invention. As shown, each of these flows utilizes an AI-based text classifier to identify, in real time, whether or not a call should be recorded. Appropriate classifiers would include, but are not limited to, deep neural net ("DNN") classifiers and conditional random field ("CRF") classifiers. Such classifiers will typically be trained, using ML techniques, to identify calls that indicate, for example, the presence of: (i) inappropriate agent behavior (e.g., swearing, interruption, off-script, negative tone, etc.); (ii) frustrated or angry customer sentiment; (iii) threats of escalation (e.g., references to supervisor, lawsuit, Better Business Bureau, news media, etc.); and/or (iv) possible customer churn.

What is claimed is:

1. A process for operating a telephonic contact center monitoring system, comprising:
 (a) at least the following steps, performed within a first security zone:
  (i) receiving, in real time, contact center telephony data indicative of multiple agent-caller communications;
  (ii) separating, in real time, the received telephony data into tagged utterances, each representing a single utterance spoken by either an agent or a caller;
  (iii) using a privacy-filtering automatic speech recognition (ASR) engine to process each utterance, in real time, into a corresponding sanitized ASR transcription;
 (b) at least the following steps, performed within a second security zone:
  (i) receiving, in real time, the tagged utterances;
  (ii) updating, in real time, a database to include each tagged utterance;

(iii) receiving, in real time, a critical call alert, wherein the critical call alert is generated by the system based upon one or more of the sanitized ASR transcription(s);

(c) wherein the first zone has fewer security restrictions than the second zone.

2. The process of claim 1, wherein the second security zone permits access by fewer users than the first security zone.

3. The process of claim 2, wherein access to the second security zone is restricted to individuals who have successfully passed a criminal background check, drug test, and credit check.

4. The process of claim 1, wherein the steps performed within the second security zone further include:

(iv) investigating the critical call alert by retrieving from the database utterance(s) associated with the identified critical call.

5. The process of claim 4, wherein the steps performed within the second security zone further include:

(v) employing a speech browser to display/play sanitized ASR transcript(s) and corresponding utterance(s) associated with the identified critical call.

6. The process of claim 1, wherein steps (a)(i)-(iii) are performed without storing any contact center telephony data in non-volatile storage locations.

7. The process of claim 1, wherein immediately following transcription of an utterance in step (a)(iii), all contact center telephony data that corresponds to the transcribed utterance is removed/whitewashed from any computer readable storage device(s) in the first security zone.

8. The process of claim 1, wherein the steps performed within the first security zone further include:

(iv) updating, in real time, a database to include the sanitized ASR transcription.

9. The process of claim 8, wherein the steps performed within the first security zone further include:

(v) providing real time analytics, based on the sanitized ASR transcriptions.

10. The process of claim 1, wherein step (a)(iii) utilizes an ASR engine to transcribe each utterance and a post-ASR redaction engine redact each transcription in accordance with specified redaction criteria.

11. The process of claim 1, wherein step (a)(iii) utilizes a privacy-by-design speech-to-text (STT) engine to transcribe only non-sensitive information in accordance with an associated privacy-by-design language model.

12. The process of claim 1, further comprising an initial step of selecting class(es) of sensitive information to tokenize, including one or more of:

(1) personal names or identifying numbers;
(2) ages;
(3) locations;
(4) organizations or entities; and/or
(5) health conditions, procedures or treatments.

13. The process of claim 12, further comprising an initial step of selecting one or more of the selected class(es) for stratified tokenization.

14. The process, as defined in claim 1, further comprising the step of: using a machine learning (ML)/natural language processing (NLP) classifier to identify critical calls, in real time, based on the sanitized ASR transcriptions.

15. A process for operating a telephonic contact center monitoring system, comprising:

(a) at least the following steps, performed within a first security zone:
(i) receiving, in real time, contact center telephony data indicative of multiple agent-caller communications;
(ii) separating, in real time, the received telephony data into tagged utterances, each representing a single utterance spoken by either an agent or a caller;
(iii) updating, in real time, a database to include each tagged utterance;
(iv) using a privacy-filtering ASR engine to process each utterance, in real time, into a corresponding sanitized ASR transcription;
(v) receiving, in real time, a critical call alert, wherein the critical call alert is generated by the system based upon one or more of the sanitized ASR transcription(s);

(b) at least the following steps, performed within a second security zone:
(i) updating, in real time, a database to include each sanitized ASR transcription;

(c) wherein the second zone has fewer security restrictions than the first zone.

16. The process of claim 15, wherein the steps performed within the second security zone further include:

(ii) providing real time analytics, based on the sanitized ASR transcriptions.

17. The process of claim 15, wherein step (a)(iv) utilizes an ASR engine to transcribe each utterance and a post-ASR redaction engine redact each transcription in accordance with specified redaction criteria.

18. The process of claim 15, wherein step (a)(iv) utilizes a privacy-by-design STT engine to transcribe only non-sensitive information in accordance with an associated privacy-by-design language model.

19. The process of claim 18, further comprising an initial step of selecting class(es) of sensitive information to tokenize, including one or more of:

(1) personal names or identifying numbers;
(2) ages;
(3) locations;
(4) organizations or entities; and/or
(5) health conditions, procedures or treatments.

20. The process of claim 19, further comprising an initial step of selecting one or more of the selected class(es) for stratified tokenization.

* * * * *